United States Patent
Krishnamoorthy et al.

(10) Patent No.: US 6,396,970 B1
(45) Date of Patent: May 28, 2002

(54) ASYNCHRONOUS TRANSFER OF HIGH SPEED DATA SIGNALS THROUGH AN OPTOELECTRONIC VLSI SWITCH

(75) Inventors: Ashok Krishnamoorthy; Richard G. Rozier, both of Middletown; Anthony L. Lentine, Holmdel, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/510,044

(22) Filed: Feb. 22, 2000

(51) Int. Cl.[7] .............................................. G02B 26/08
(52) U.S. Cl. ......................................... 385/16; 385/147
(58) Field of Search ............................. 385/16–24, 147; 359/128, 139; 370/232, 463, 466

(56) References Cited

U.S. PATENT DOCUMENTS 6,058,227 A * 5/2000 Wong .......................... 385/16
6,229,932 B1 * 5/2001 Fukashiro et al. ............ 385/16

* cited by examiner

*Primary Examiner*—Phan T. H. Palmer
(74) *Attorney, Agent, or Firm*—Gregory A. Welte

(57) ABSTRACT

A switch, of the crossbar type, in which no clock recovery is undertaken. Multiple optical fibers deliver input signals to a single semiconductor die. The die contains circuitry which selectively connects each input fiber to a respective output fiber, which carries the signals off the die, to their destinations. The communication is asynchronous: no continuous clock signal accompanies the incoming data. However, periodic sequences of clock signals accompany the incoming data, and are used by circuitry on the die in "clock recovery" routines, to generate local clock signals. The invention eliminates the need for local clock recovery: the incoming signals are routed through the die to outgoing fibers, without generation of a local clock signal on the die.

12 Claims, 20 Drawing Sheets

ASYNCHRONOUS TRANSFER OF HIGH SPEED DATA SIGNALS THROUGH AN OPTOELECTRONIC VLSI SWITCH

The invention relates to a communication system in which multiple signals, on multiple optical waveguides, arrive at a switch. The switch converts the optical signals into electronic signals and routes each electronic signal to a selected transmitter, which generates optical signals for transmission onto an output waveguide. However, in these processes, the invention performs no local recovery of a clock signal from the incoming signals.

BACKGROUND OF THE INVENTION

In optical communication, a component called a "switch" is used. The switch performs a routing function. A given switch may receive signals from ten input optical fibers. That switch may connect to ten outgoing optical fibers.

The switch routes signals from each input fiber to a selected output fiber. For example, at a given point in time, the routing may be as shown in the following Routing Table.

| Routing Table | |
|---|---|
| Input Fiber | Connected to Output Fiber |
| 1 | 10 |
| 2 | 9 |
| 3 | 8 |
| 4 | 7 |
| 5 | 6 |
| 6 | 5 |
| 7 | 4 |
| 8 | 3 |
| 9 | 2 |
| 10 | 1 |

The Table shows that input fiber number 1 is connected to output fiber number 10, input 2 is connected to output 9, and so on.

The signals carried by all fibers, input and output, are asynchronous: no clock signal accompanies them. For reasons which need not be explained here, the switch "recovers" a clock signal from the incoming signal on a fiber, and utilizes that recovered clock signal for its own internal purposes.

The circuitry involved in recovering the clock signal consumes large amounts of area within an integrated circuit, and also consumes large amounts of power.

SUMMARY OF THE INVENTION

In one form of the invention, a switch accepts multiple input signals on multiple optical waveguides, and routes each signal to an output waveguide, but without recovering a clock signal from the input signals.

BRIEF DESCRIPTION OF THE DRAWINGS

FIGS. 3–5 illustrate circuitry capable of implementing one form of the invention.

FIG. 17 illustrates routes R, or data channels, established between transceivers T.

DETAILED DESCRIPTION OF THE INVENTION

Several aspects of the invention are discussed below, under the heading "One Form of Invention," which describes FIG. 18 and subsequent Figures. The material which precedes that section, and which begins immediately below, provides a background for understanding those aspects of the invention.

Optical Transceiver Requiring no Local Light Source

Figure 1:
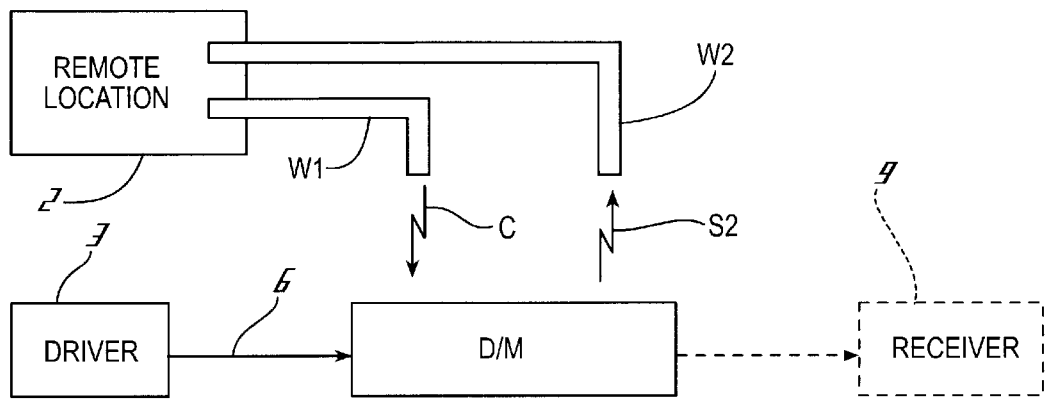
FIG. 1 illustrates one form of the invention, operating in transmission mode.
Figure 2:
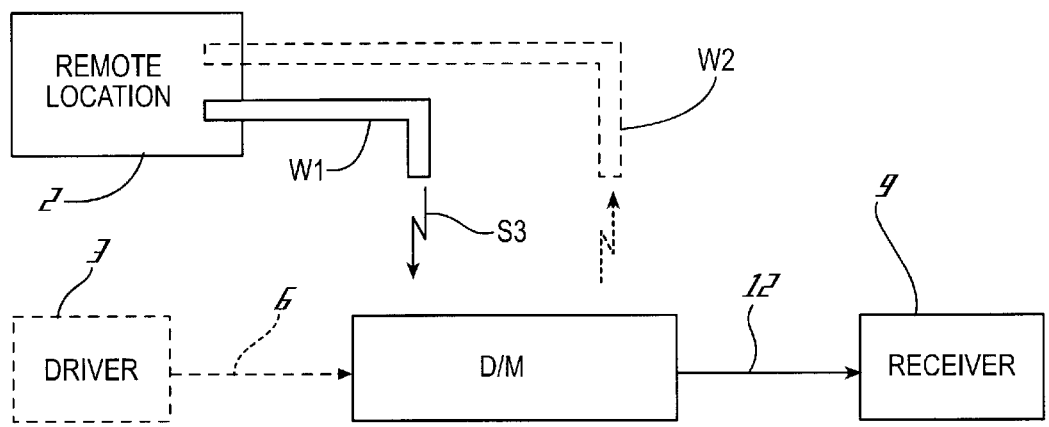
FIG. 2 illustrates one form of the invention, operating in reception mode.
Figure 1:
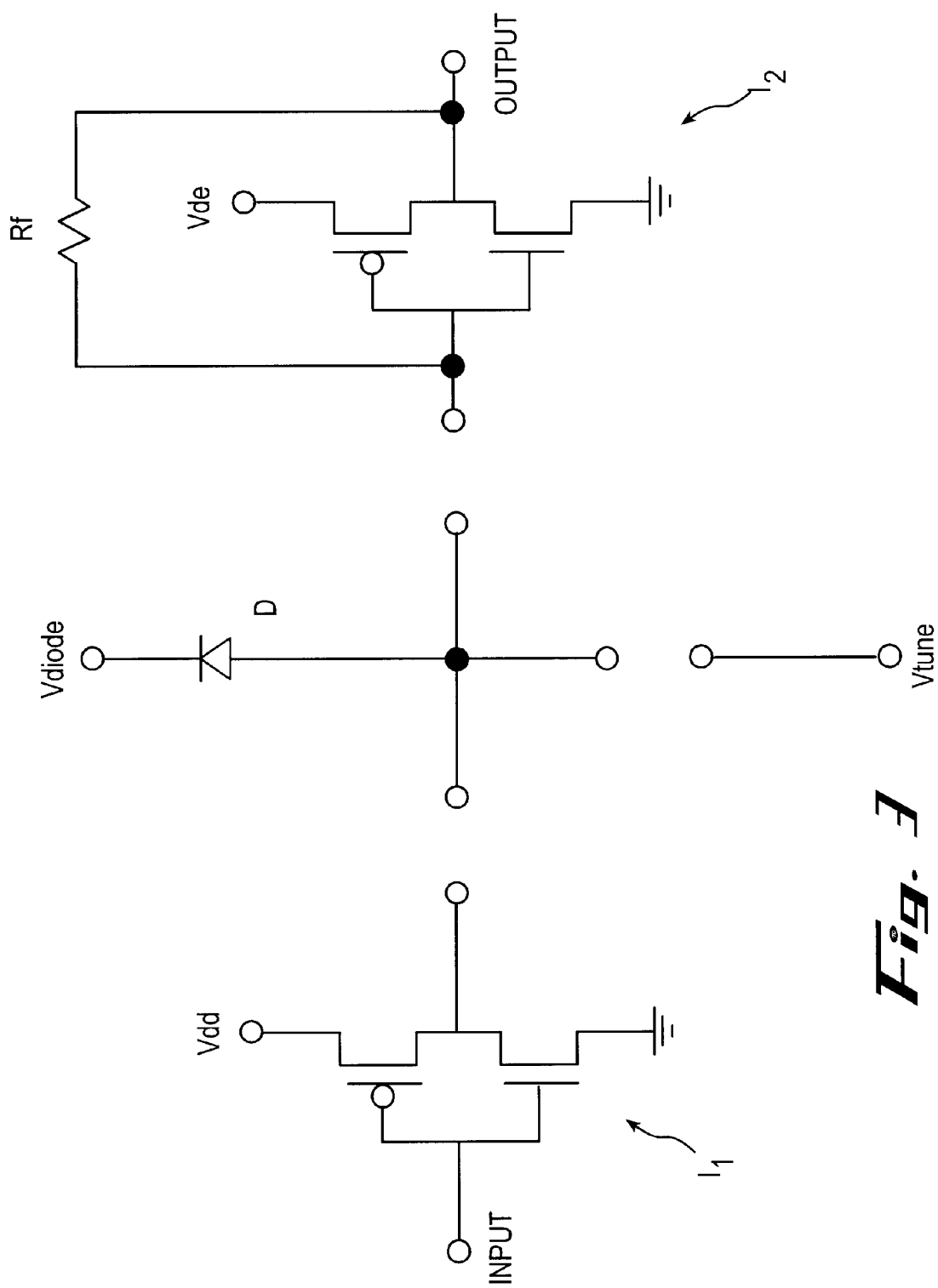

FIGS. 1 and 2 illustrate an optical transceiver. In each Figure, some components are drawn in phantom. Those components are not involved in the mode of operation described in the respective Figure. A pair of waveguides W1 and W2, such as optical fibers, connect with a remote location 2.

In FIG. 1, the apparatus operates in a transmission, or modulation, mode. The remote location 2 delivers an incoming optical carrier C to detector/modulator D/M, using waveguide W1. Detector/modulator D/M modulates the carrier C, and produces a modulated signal S2, which is delivered to waveguide W2, which transmits the modulated signal to the remote location 2.

The modulation is controlled by a driver 3. For example, if the driver 3 produces a logic HIGH signal on line 6, the HIGH signal causes the detector/modulator D/M to transmit the carrier C as optical signal S2, and that transmitted signal S2 is interpreted by the remote location as a logic HIGH. Conversely, if driver 3 produces a logic LOW signal on line 6, the LOW signal causes the detector/modulator to block the carrier C. No signal S2 is received by the remote location, and that absence is interpreted as logic LOW.

Receiver 9 is not operative at this time, and is thus shown in phantom.

FIG. 2 shows operation in receive mode. Driver 3 is not operative at this time, and is thus shown in phantom. The remote location 2 delivers an incoming optical signal S3 to detector/modulator D/M, using waveguide W1. The detector/modulator D/M detects the signal 3, and produces a corresponding signal on line 12. Receiver 9 receives that signal, amplifies it, and delivers it to appropriate processing equipment (not shown). No signal is delivered to waveguide W2.

It is emphasized that signal C in FIG. 1 is treated as a carrier: it is modulated by detector/modulator D/M, and the modulated signal is passed to waveguide W2. In contrast, signal S3 in FIG. 2 is treated as data.

One benefit to this approach is that detector/modulator D/M can transmit data, as in FIG. 1, but no local light source is required by detector/modulator D/M. The light source is located within the remote location 2, which can be miles distant.

By pre-arrangement, the times-of-arrival of the signals, be they carrier or data, determine whether they are treated as carriers or as data. For example, a predetermined set of time-windows are assigned to carrier C, and another predetermined set of time-windows are assigned to signal S3. As another example, the signals, data or carrier, can be grouped together, and preceded by a "header." The header is a set of signals which identifies the group which follows as either data or carrier.

It is emphasized that the detector/modulator D/M contains a single physical structure, which operates both as a modulator, in FIG. 1, and a detector, in FIG. 2. Restated, the detector/modulator D/M is not, for example, a circuit board containing (1) a first component which performs the modulation of FIG. 1, and (2) a second component which performs the detection of FIG. 2. Instead, a single structure is used, but in different modes of operation. As explained below, that structure is preferably a gallium-arsenide/aluminum-gallium-arsenide, or GaAs/AlGaAs, multiple quantum well (MQW) p-i-n diode structure.

FIG. 3 shows a circuit which allows a single diode D to be used as both a detector and a modulator. That diode D represents one embodiment of detector/modulator D/M of FIG. 1.

Figure 4:
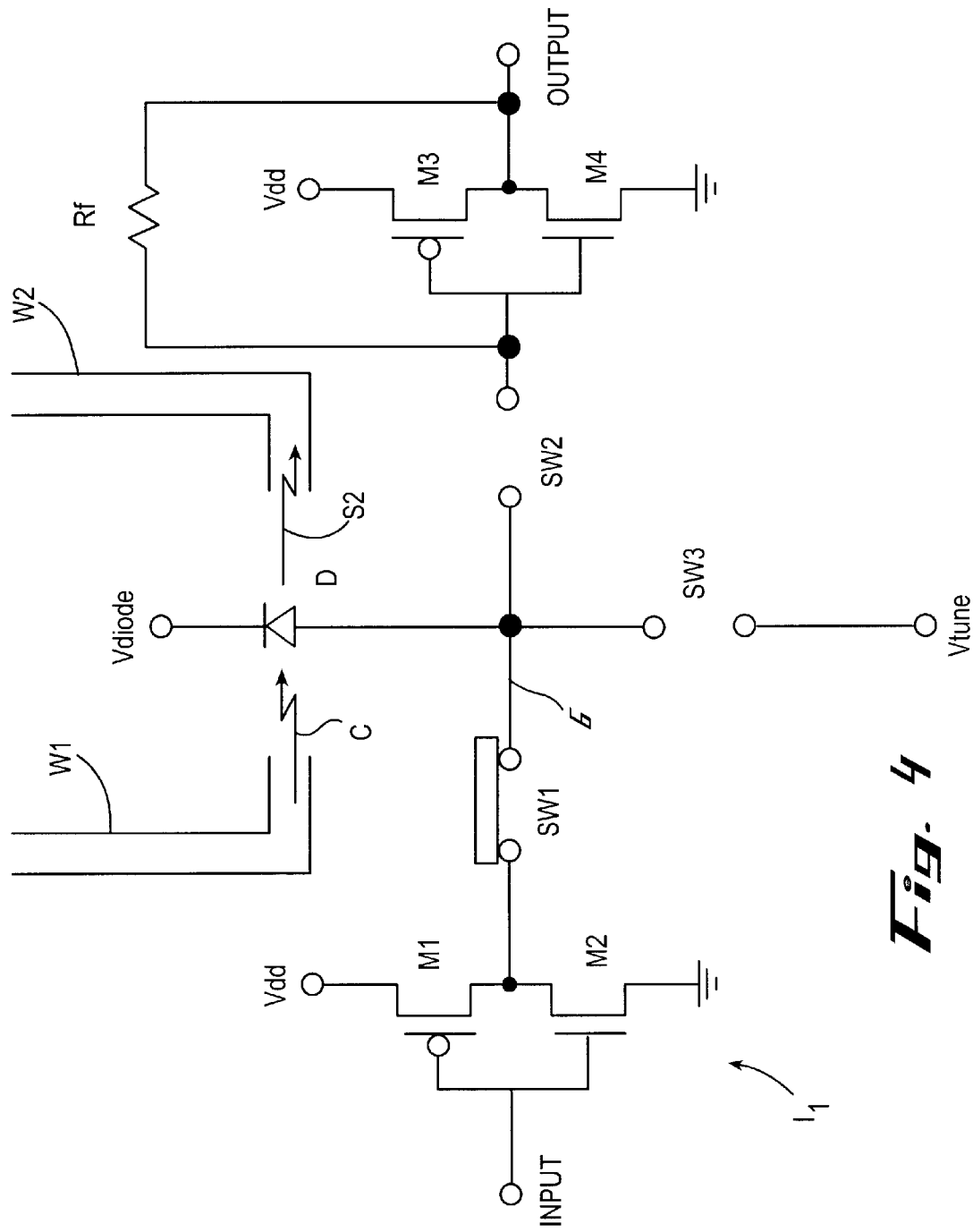

FIG. 4 shows the apparatus of FIG. 3 operating in transmission mode, as in FIG. 1. In FIG. 4, switch SW1 is closed. That switch may take the form of a pass-transistor, or a tri-state buffer. A CMOS inverter I1 receives an INPUT signal.

If that signal is HIGH, transistor M1 is pulled OFF, while transistor M2 is pulled ON. Line 6 is pulled LOW. Conversely, if the INPUT signal is LOW, transistor M1 is pulled ON, while transistor M2 is pulled OFF. Line 6 is pulled HIGH. Thus, line 6 is the logical inverse of the INPUT, and line 6 controls the voltage applied to diode D, and thus the modulation applied to the incoming light C received from waveguide W1.

Figure 5:
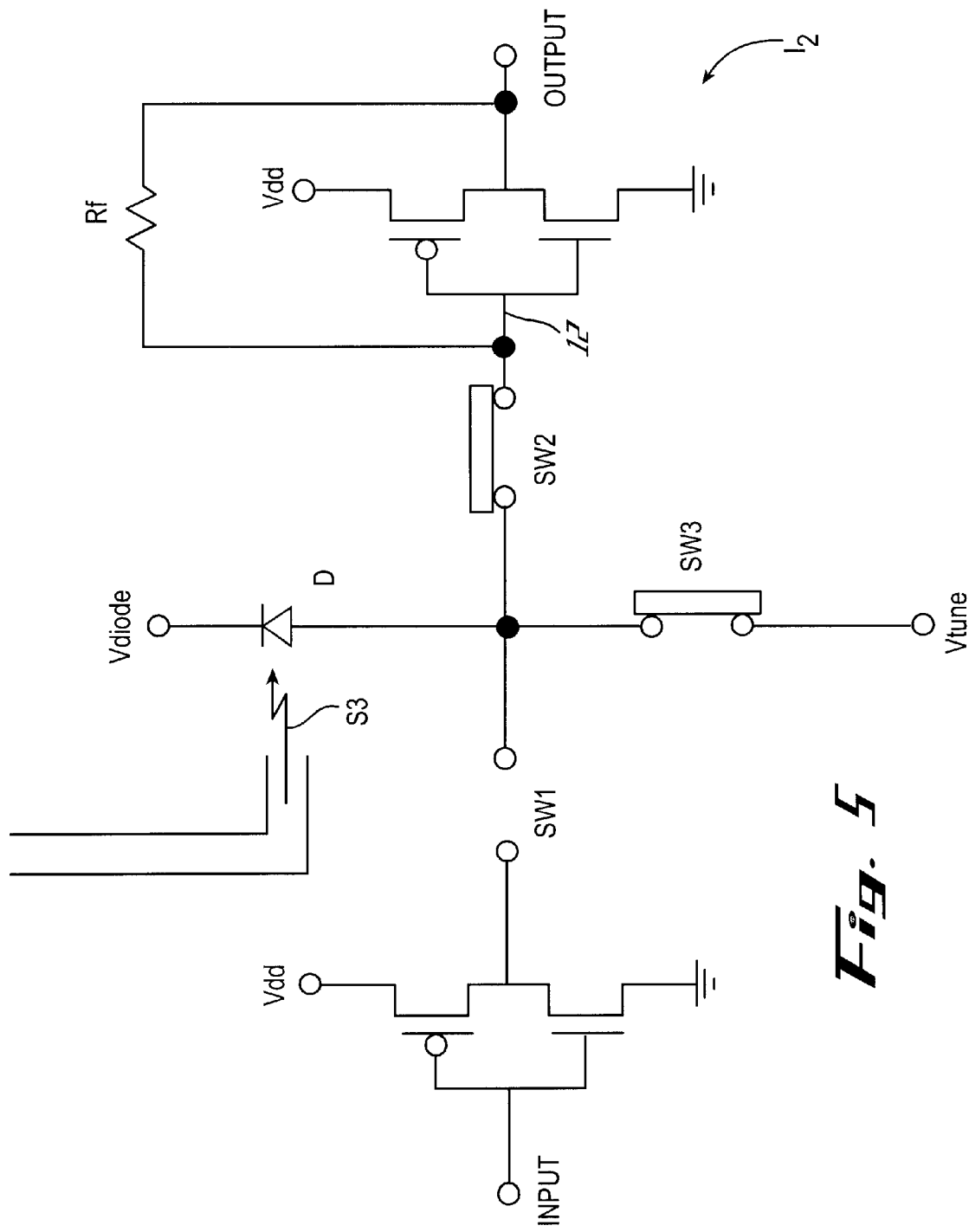

FIG. 5 shows the apparatus of FIG. 3 operating in receive mode, as in FIG. 2. In FIG. 5, switches SW2 and SW3 are closed. Switch SW3 applies voltage Vtune to the diode D, thereby controlling the bias applied to diode D. The diode D receives the incoming data signal S3, and, in response, applies a signal to line 12. Inverter I2, configured as a transimpedance amplifier by virtue of feedback resistor Rf, amplifies the signal and applies it to the OUTPUT.

Signal S3 may be analog or digital.

Application to Network

Figure 6:
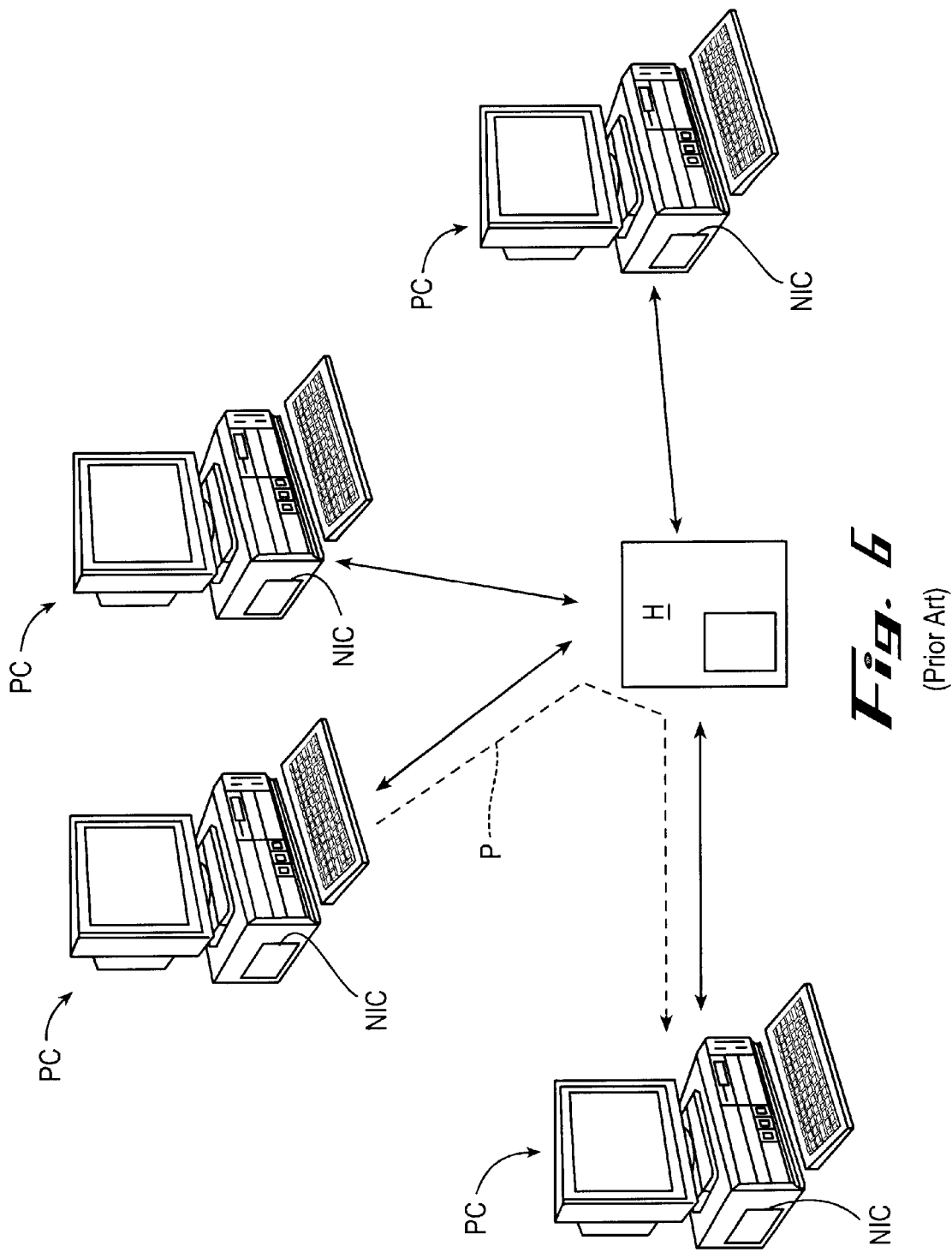
FIG. 6 illustrates a prior-art network.

The circuits described above can be applied to network communication. FIG. 6 illustrates a prior-art network, and shows multiple computers PC, each containing a Network Interface Card, NIC. FIG. 6 illustrates a star-topology, wherein the NICs connect to a central hub H, which routes data, such as along path P.

Figure 7:
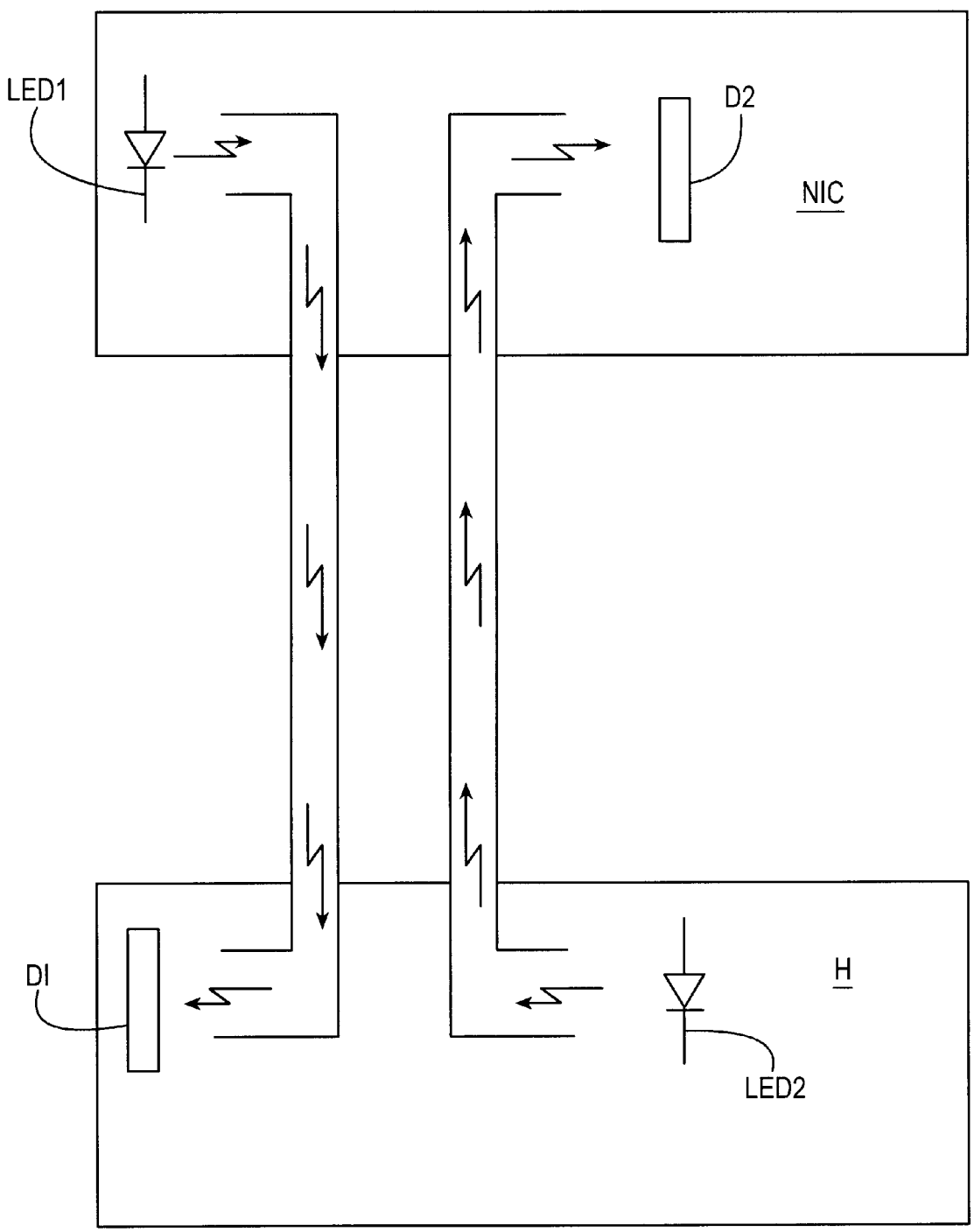
FIG. 7 illustrates one type of communication used in FIG. 6.

FIG. 7 represents one approach used by the system of FIG. 6 for optical communication. In FIG. 7, a light source within the hub H, such as LED2, transmits a signal to a detector D2 within an NIC. Similarly, a light source within the NIC, such as LED1, transmits a signal to detector D1 within the hub H.

Figure 8:
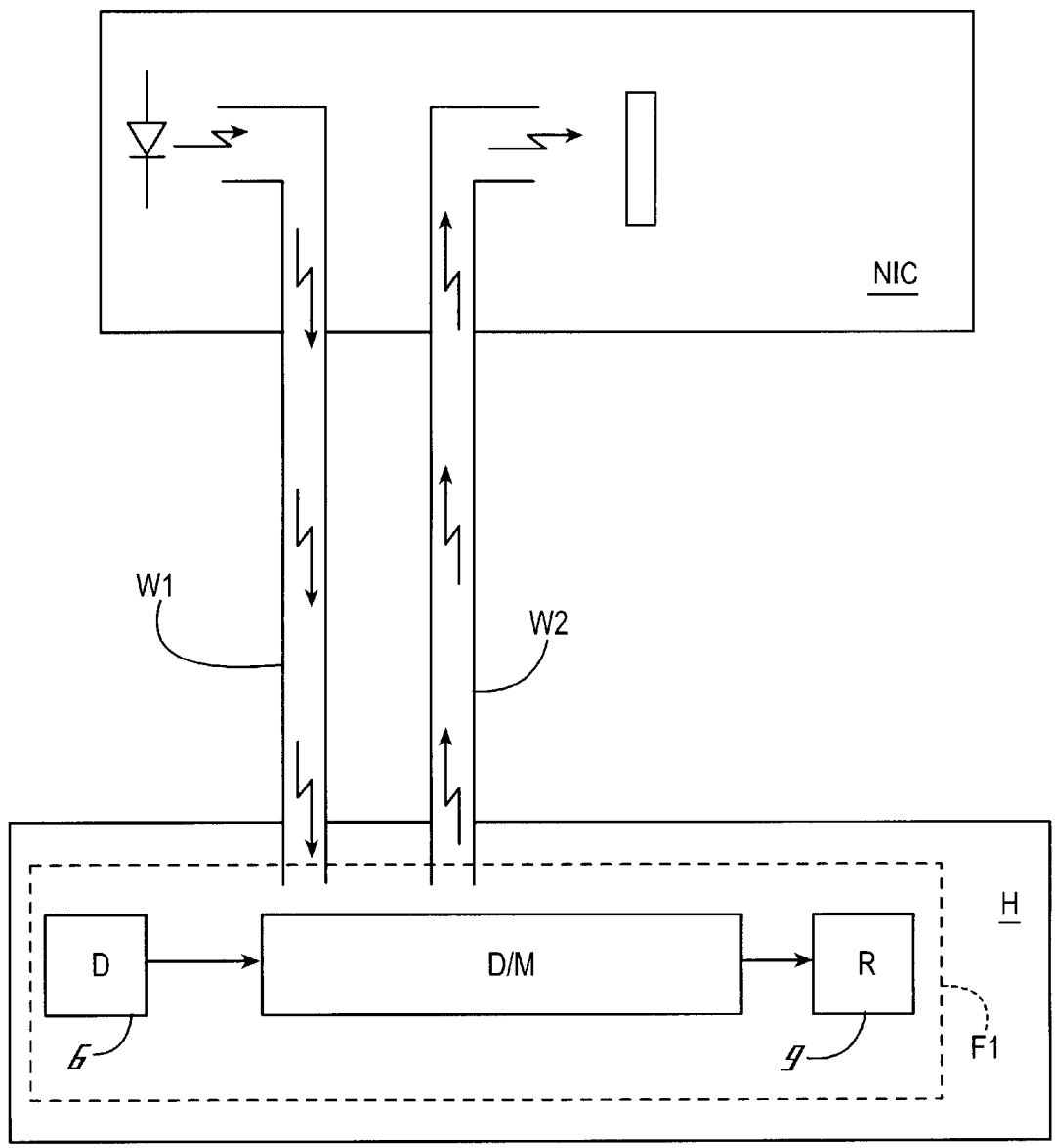
FIG. 8 illustrates one approach by which a Network Interface Card, NIC, communicates with an optoelectronic VLSI chip.

In one embodiment, the light source within the hub H is eliminated, as shown in FIG. 8. The hub H is equipped with a circuit of the type shown in FIG. 1, as indicated by the phantom block labeled F1. For example, the hub H receives data on waveguide W1. W2 is not used at that time. When the hub H transmits data, it receives a carrier on waveguide W1, modulates it, and transmits the modulated carrier on waveguide W2.

Figure 9H:
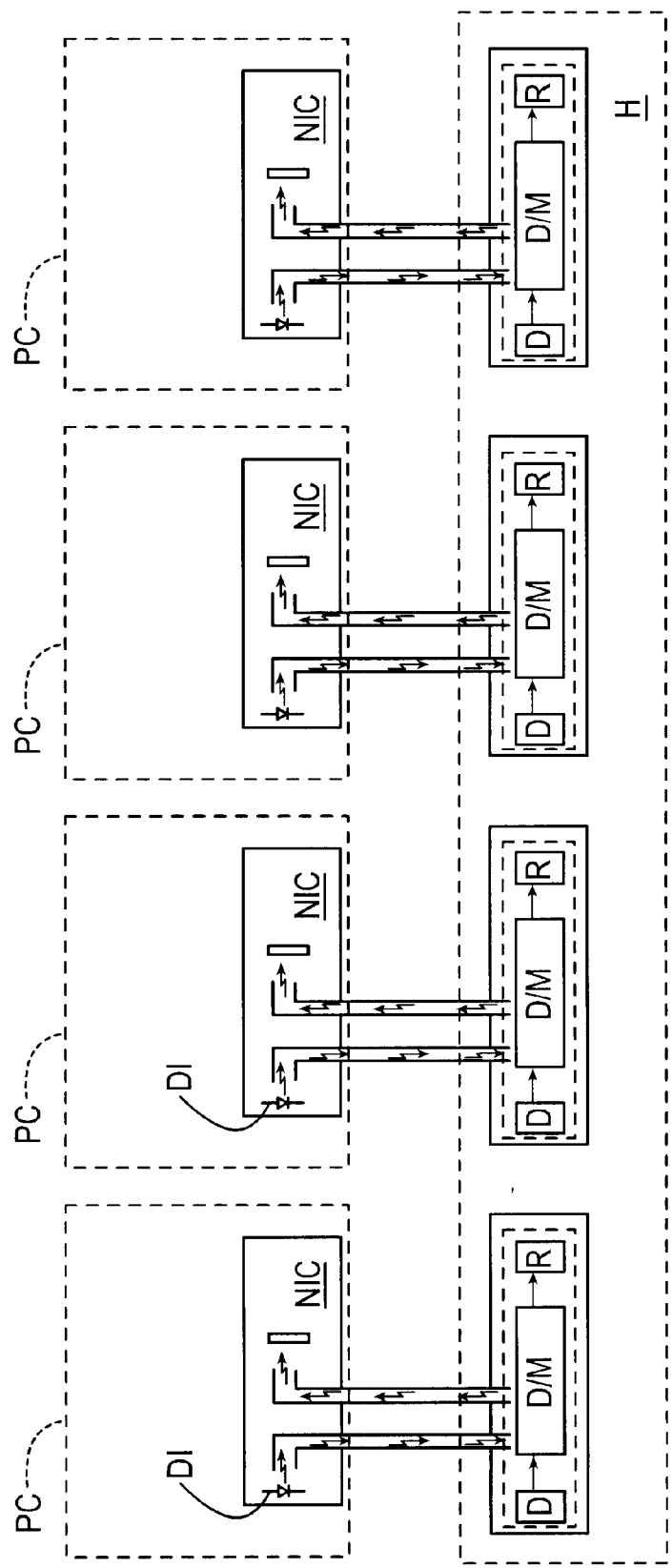
FIG. 9A illustrates the apparatus of FIG. 8 utilized in a network.
FIG. 9B illustrates an approach to communication between NICs and a central VLSI chip, using a central optical power source.

FIG. 9A illustrates a group of the units shown in FIG. 8. In FIG. 9A, multiple NICs, contained within computers PCs, communicate with a common hub H. Each NIC contains its own light source, indicated by the diodes D1.

Figure 9B:
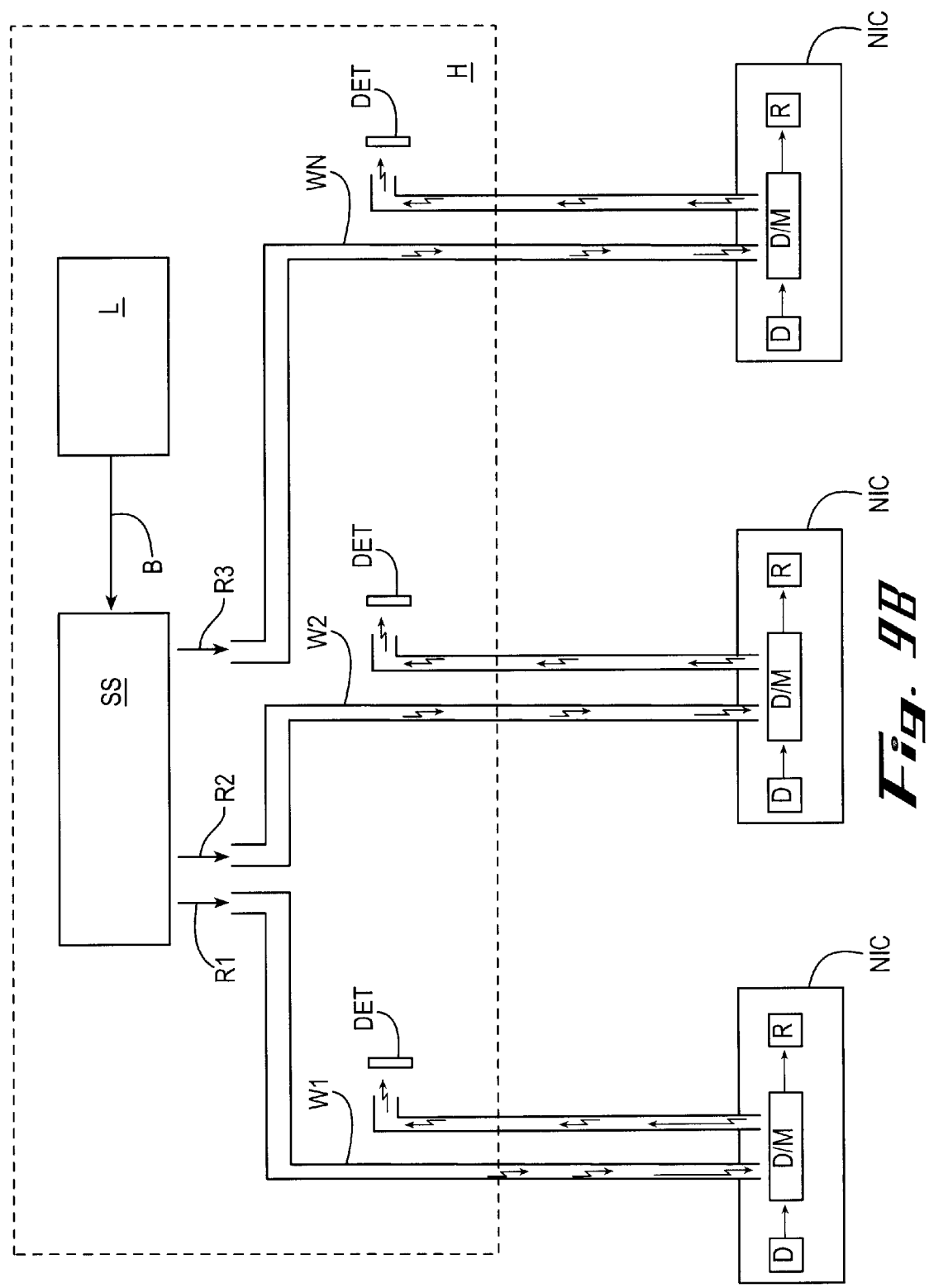

In another embodiment, roles are reversed: the NICs contain no local light sources, and light which they modulate is received from the hub H. FIG. 9B illustrates an example. The hub H contains a laser L, whose beam B is split into multiple rays R1–RN by a splitting system SS, known in the art. These rays are carried by waveguides W1–WN to the NICs.

Each waveguide corresponds in function to waveguide W1 in FIG. 1. If a ray R carries data, (modulators within the hub H for modulating the rays to generate the data are not shown) the NIC receives and processes it. If a ray is a carrier, then the detector/modulator D/M within an NIC will modulate it, and return it to a detector DET within the hub H.

A significant advantage of utilizing a single laser arises because the detector/modulators D/M in FIGS. 1 and 9B are often frequency-sensitive. That is, they only respond to light within a specific wavelength band, which is often 10 nanometers wide. Further, this band can change.

If each frequency-sensitive detector/modulator D/M were equipped with its own local laser (not shown), that laser would require periodic frequency-tuning. This tuning procedure is a maintenance operation, which incurs monetary costs. These costs become significant when a multiplicity of NICs, at diverse geographic locations, and each equipped with at least one laser, are involved.

Under the system of FIG. 9B, the single, centralized laser L can be tuned, otherwise maintained, and replaced, at a far lower cost of time and material. In the tuning procedure, the frequency of the laser L is adjusted until it matches the specifications of the detectors used, and then placed in operation.

Adaptation to Existing Protocol

Figure 10A:
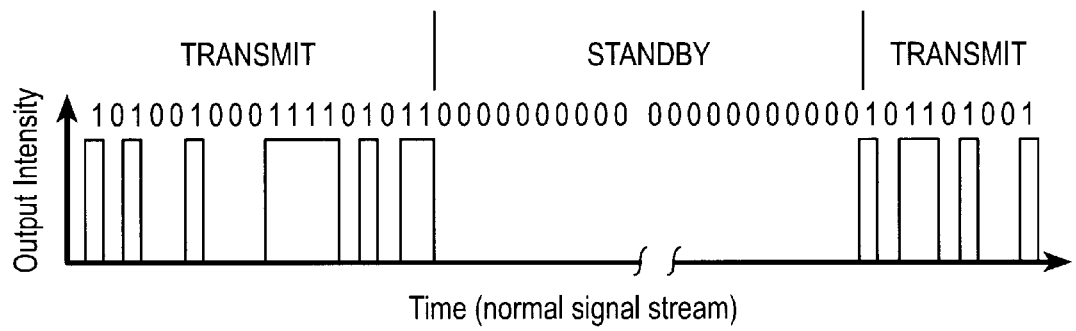
FIG. 10A illustrates a prior-art signal protocol.

The protocol used by some types of network architectures is readily adaptable to the approaches described herein. For example, some protocols require each NIC to alternately (1) transmit data and then (2) wait, in a standby mode. FIG. 10A illustrates this operation: the NIC resides in a "standby" mode periodically, wherein no data is transmitted.

Figure 10B:
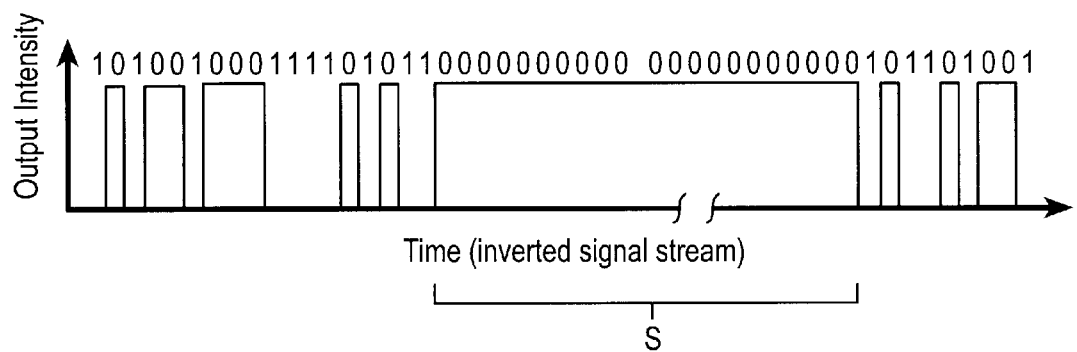
FIG. 10B illustrates a signal protocol used for transmission of data.

FIG. 10B illustrates a modification of the approach of FIG. 10A. In the modification, signal of FIG. 10A is inverted. With the inversion, NIC generates a continual signal S during the standby period, corresponding to carrier C in FIG. 4.

Stated in different words, in the prior art, the NICs issue a logic ZERO signal during standby mode. However, in a modification of that protocol, the NICs issue a logic ONE signal, or continuous light beam, during standby mode.

FIG. 10B indicates that the entire prior-art signal of FIG. 10A is inverted. In another embodiment, the signal is inverted only during the standby mode. That is, the "transmit" signals of FIG. 10A are used to transmit data, and the "standby" signal of FIG. 10B is used to transmit a carrier. That carrier acts as carrier C in FIG. 1.

Array of Transceivers

Figure 11:
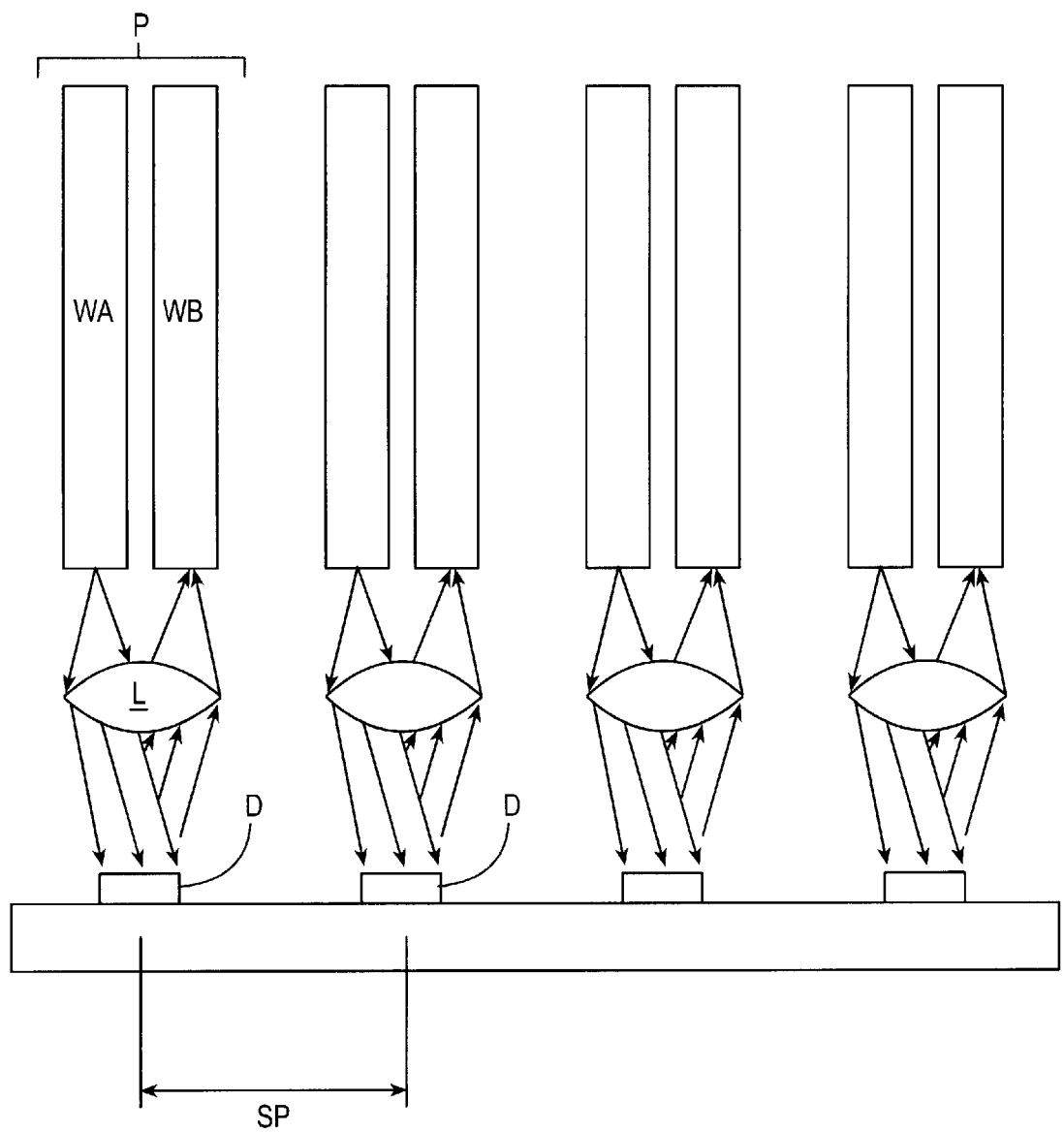
FIGS. 11–15 illustrate various approaches to transmission between a VLSI chip and remote NICs.

FIG. 11 shows an array of detectors D, each of which represents a detector/modulator D/M in FIG. 1. In FIG. 11, associated with each detector D is a small lens L, and a pair P of optical fibers WA and WB. Those fibers correspond to waveguides W1 and W2 in FIG. 1.

The apparatus of FIG. 11 can be constructed using known fabrication techniques. In a high-density array, the inter-detector spacing SP will be about 35–250 microns.

Another Array of Transceivers

Figure 12:
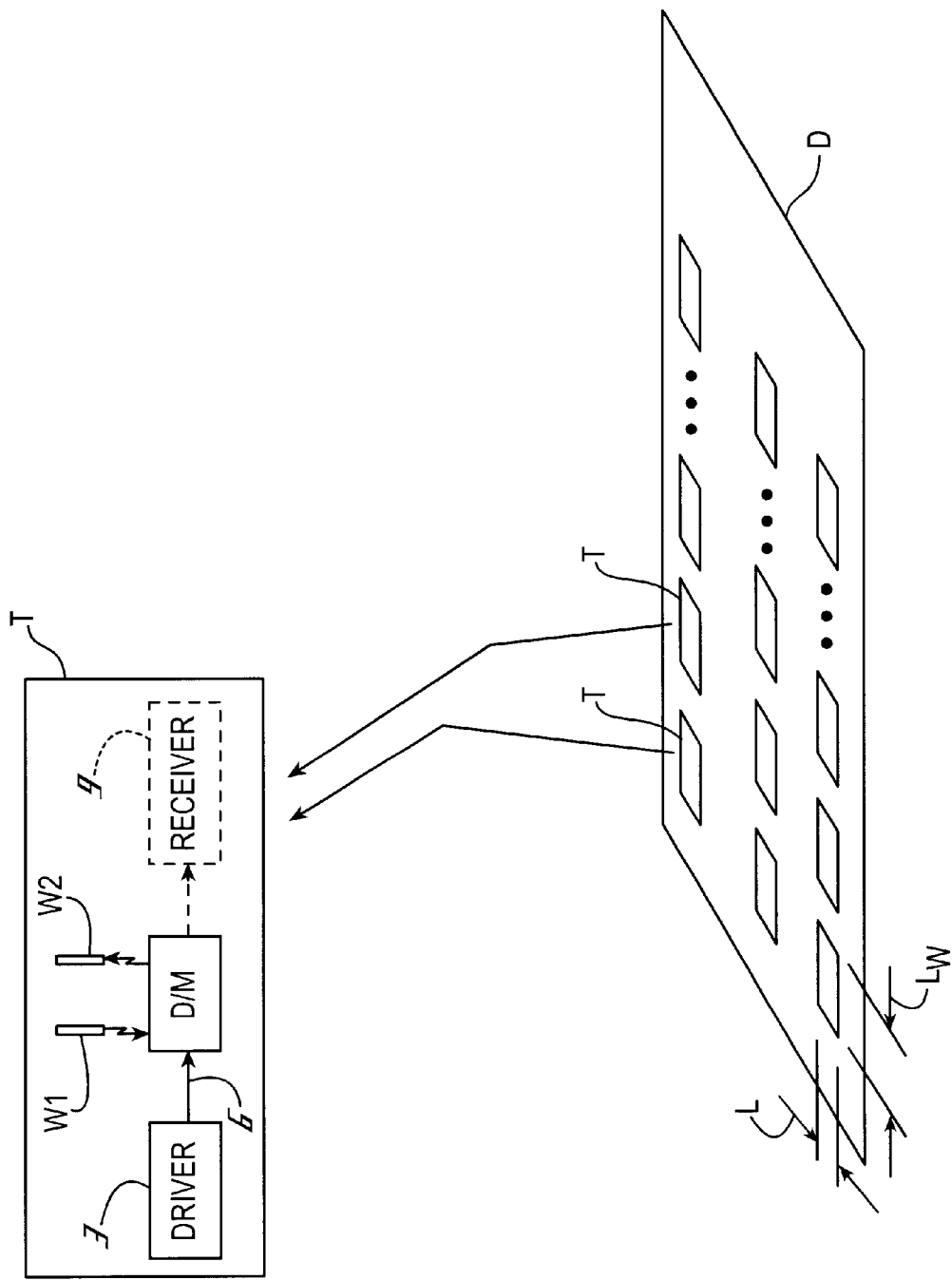

FIG. 12 illustrates a multiplicity T1, T2, etc., of the transceivers T, which is shown in FIGS. 1 and 2. The multiplicity is fabricated on a single semiconductor die D, which is cut from a larger wafer (not shown) after fabrication.

Each transceiver T occupies a space of about 20×20 microns, indicated as dimensions L×W. The transceivers T are arranged in an array of about 64×64 transceivers, providing about 4,000 transceivers total.

Figure 13:
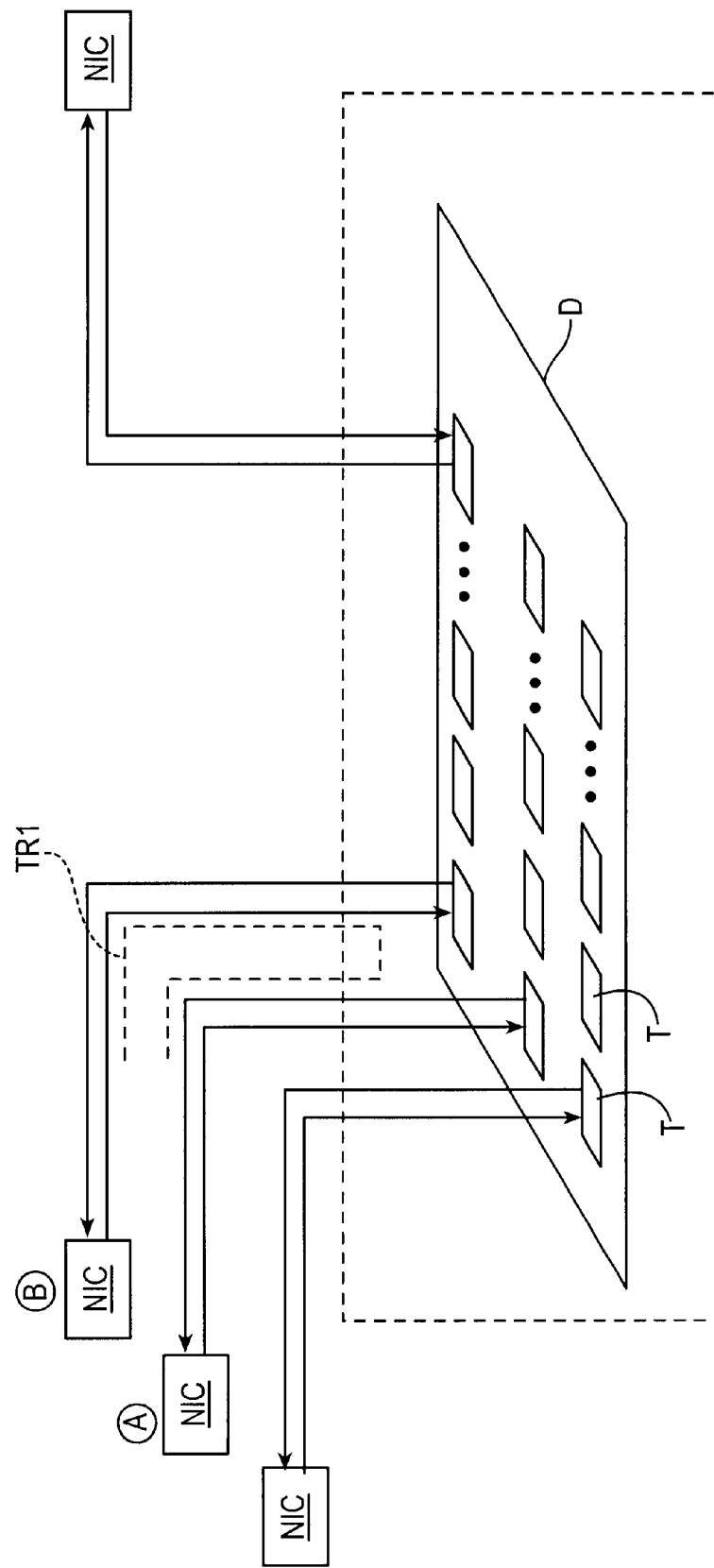
Figure 14:
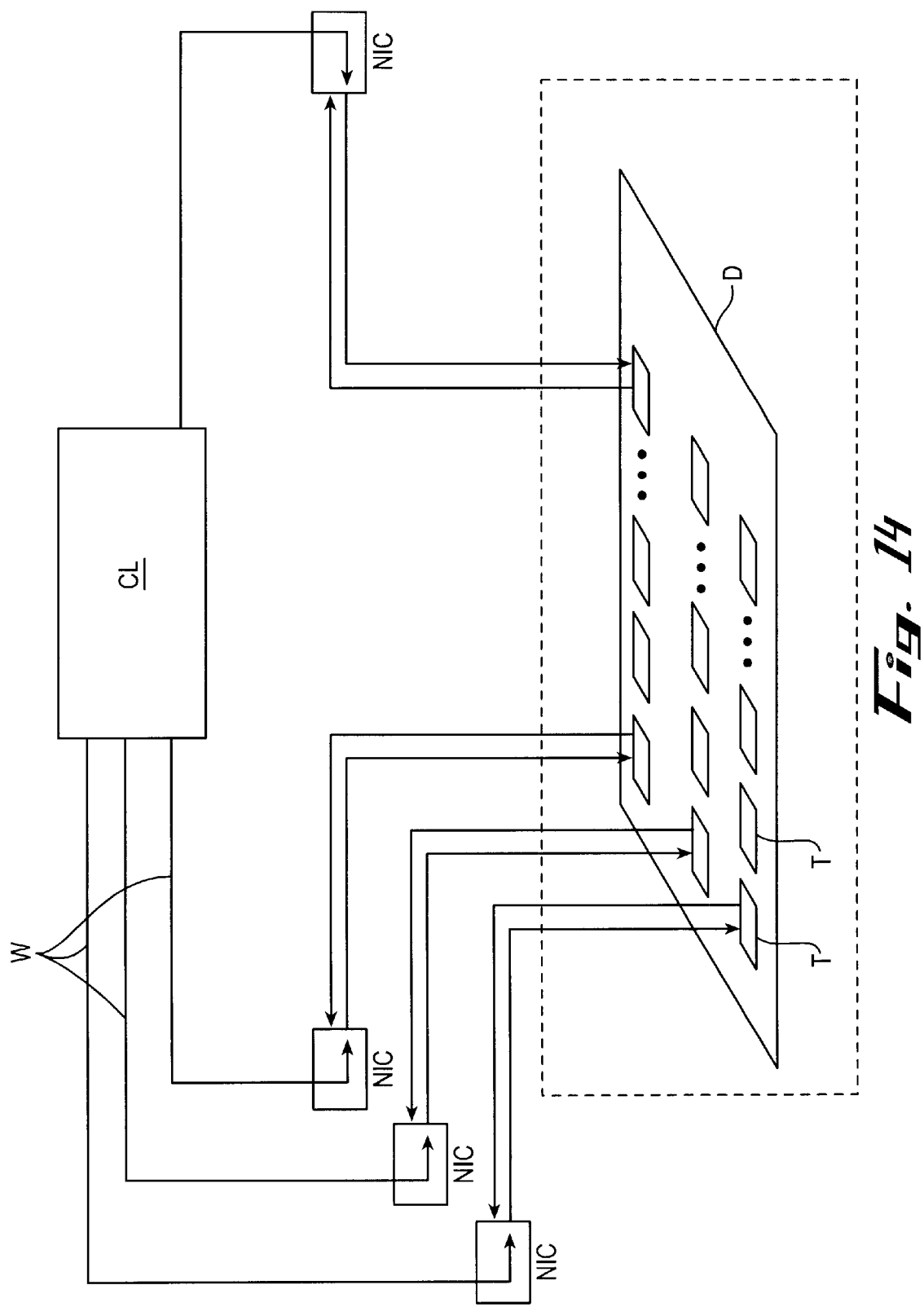
Figure 15:
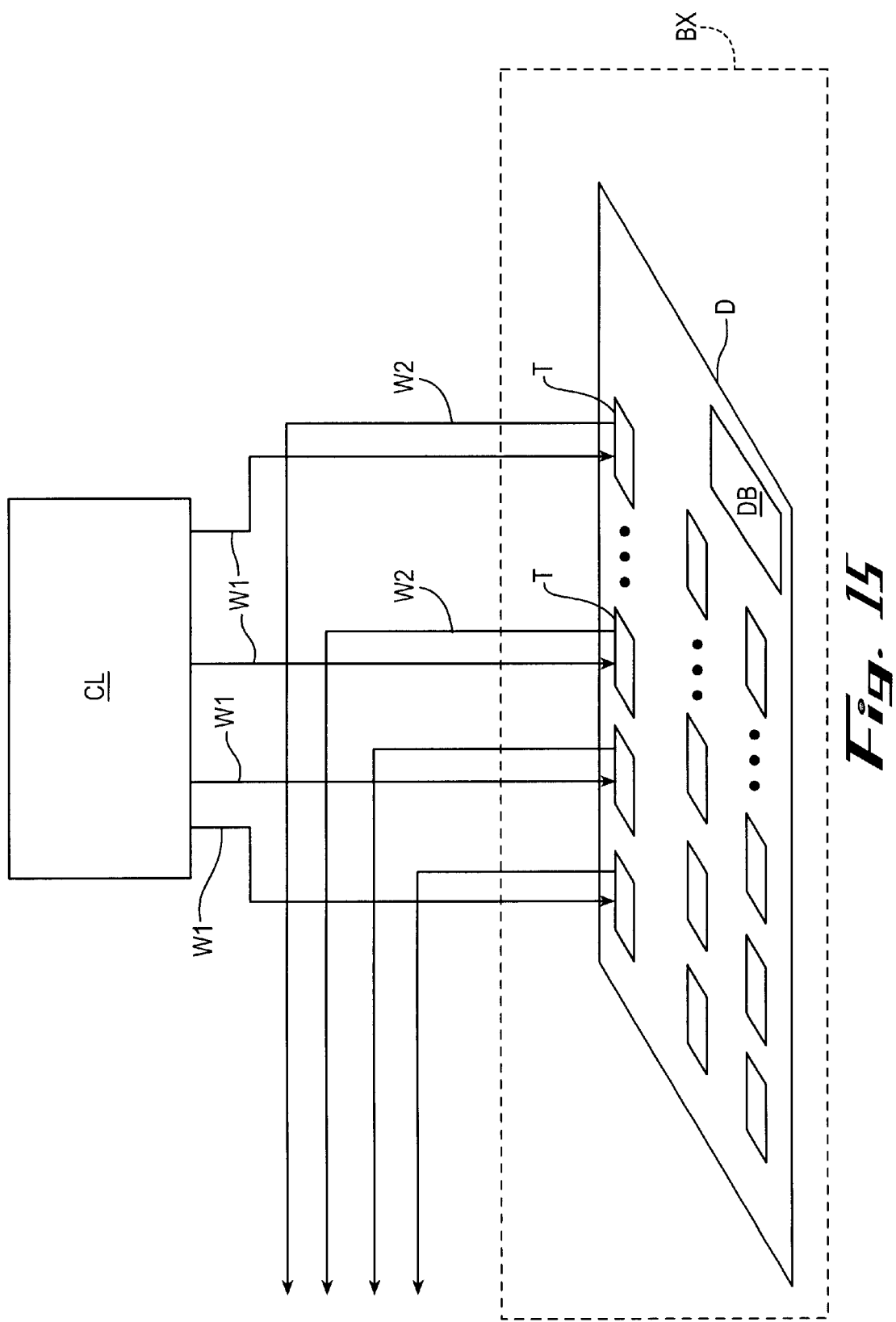

FIGS. 13–15 illustrate three applications, or configurations, in which the apparatus of FIG. 12 can be used. FIG. 13 is similar to FIG. 9A. A multiplicity of NICs is provided. Each communicates with its own transceiver T. The transceivers are interconnected by pathways (not shown) which allow any NIC to communicate with any other NIC. For example, transmission channel TRI can be established. Such pathways are known in the art.

A significant feature of FIG. 13 is that each NIC contains its own light source, as in FIG. 9A.

In FIG. 14, a common light source CL is used to provide illumination on a waveguide W to each NIC. The situation is similar to that of FIG. 9B.

In FIG. 15, the transceivers T are illuminated by the common laser CL of FIG. 14. Each line W1 corresponds in function to line W1 in FIG. 1.

In FIG. 1, each transceiver is modulated by a driver D. A similar driver D is provided, but not shown, for each transceiver T in FIG. 15. In FIG. 15, data is delivered to each driver D by circuitry represented by block DB.

A significant feature of FIG. 15, which also applies to FIGS. 13 and 14, is the magnitude of the data throughput for the device contained within dashed box BX. Each transceiver T in FIG. 15 can receive data from line W1, also shown in FIG. 1, and deliver it to its receiver 9 (shown in FIG. 1), at a rate of 1 Giga-bit per second. Each transceiver can also receive data from driver 3 (shown in FIG. 1), and deliver it to line W2 (shown in FIGS. 1 and 15), at a similar rate, namely, 1 Giga-bit per second.

Consequently, if two transceivers are connected, as by channel TR1 in FIG. 13, data can be transmitted from point A to point B at a rate of 1 Giga-bit per second.

Given four thousand transceivers T on the die, two thousand pairs can be arranged, which communicate using two thousand data channels of the type TR1. The overall data rate is two Tera-bits per second.

This data rate is attained using a die D of a size no larger than about 1 centimeter×1 centimeter.

Flow Chart

Figure 16:
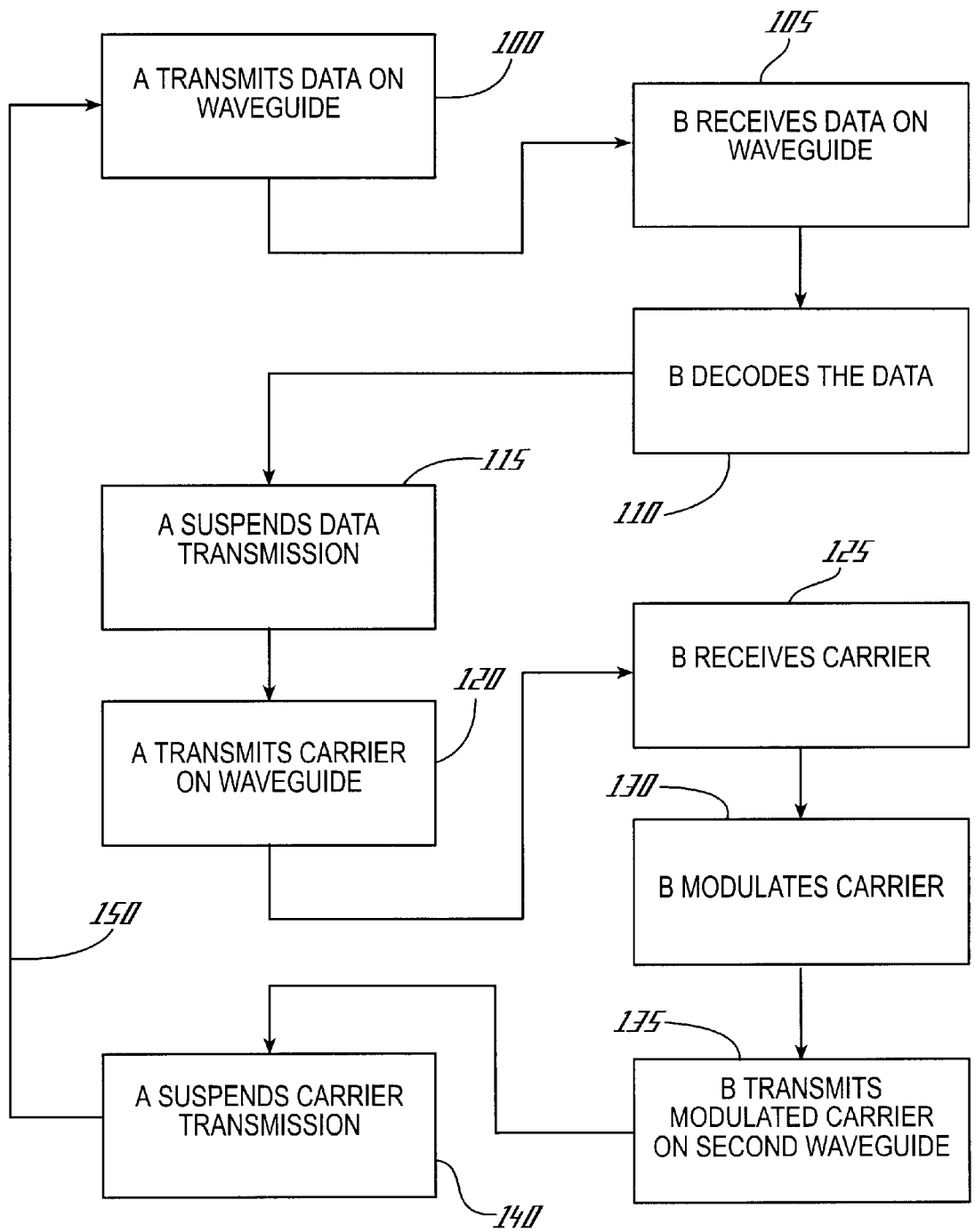
FIG. 16 is a flow chart illustrating logic implemented by apparatus described above.
Figure 11:
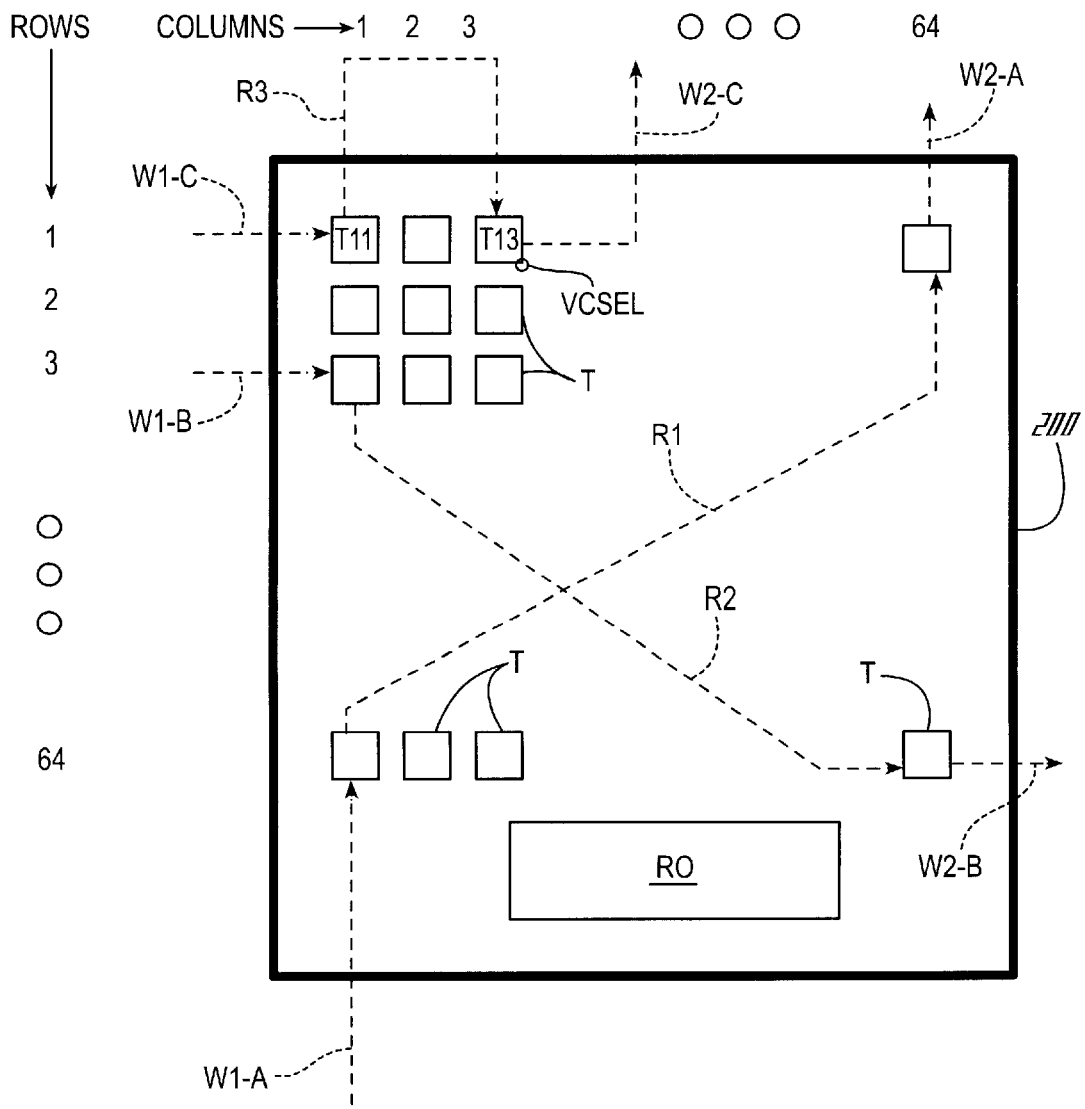

FIG. 16 is a flow chart illustrating logic implemented by apparatus described above. The column of blocks on the left side indicate actions taken by, for example, an NIC in FIG. 9A. The column of blocks on the right side indicate actions taken by, for example, the hub H in FIG. 9A.

Block 100 indicates that an agent transmits data on a waveguide. Block 105 indicates that a recipient receives the data, and block 110 indicates that the recipient decodes the data. The actions of blocks 105 and 110 can be performed using the apparatus shown in FIGS. 2 and 5 herein.

Block 115 in FIG. 16 indicates that the agent suspends transmission of the data. Block 120 indicates that the agent replaces the data on the waveguide with a carrier. Block 125 indicates that the recipient receives the carrier. Block 130 indicates that the recipient modulates the carrier. Block 135 indicates that the recipient transmits the modulated carrier on a second waveguide.

The actions of blocks 125, 130, and 135 can be performed using the apparatus shown in FIGS. 1 and 4 herein.

Block 140 indicates that the transmission of the carrier by the agent terminates. By implication, the modulation by the recipient will also terminate.

The logic returns by path 150 to block 100, and the cycle repeats.

One Form of Invention

FIG. 17 shows a die 200 containing an array of 64×64 individual transceivers T of the type shown in FIGS. 12 and 1. In FIG. 17, routing circuitry RO, known in the art, and for simplicity is shown as occupying a single discrete area, establishes routes between selected pairs of individual transceivers T.

For example, an incoming signal on line W1-A is received by the transceiver T located in (row 64, column 1). The Decoder/Modulator D/M in that transceiver T, which is shown in FIG. 12, detects the signal, and routes it to the receiver 9, shown in FIG. 12, of that transceiver T.

In FIG. 17, the receiver 9 (not shown in FIG. 17, but in FIG. 12) transmits the signal along the established route R1, to the transceiver located at (1, 64). Within that transceiver, the driver 3, shown in FIG. 12, receives the signal, and delivers it to Decoder/Modulator D/M, shown in FIG. 12, which transmits the signal on line W2-A in FIG. 17.

Similar events occur for the signal in FIG. 17 arriving on line W1-B, which is routed along the die, on route R2, and is transmitted as signal W2-B. Similarly, the signal arriving on line W1-C is routed on route R3, and exits on line W2-C.

In general, any transceiver T can be connected by a route R to any other transceiver T. The total number of transceivers equals 64-squared, or 4096. At any given time, the maximum possible number of routes R is half that number, or 2048, because a single route requires participation of two transceivers T. Restated, even though (1) 4096 input lines W1 lead to the transceivers T, one to each, and (2) 4096 output lines lead from the transceivers T, one from each, nevertheless, (3) a maximum of 2048 input lines W1 will be used at any one time to carry input signals, to a selected group of transceivers. Routes R will connect those transceivers T to 2048 other transceivers, which transmit the signals off the die, on lines W2, to their destinations.

The routes R will, in general, change as time progresses. Further, in the general case, the particular routes which are established by circuitry R are determined by either (1) signals received on a line W1 or (2) by apparatus (not shown) external to the die D, located either at the site of the die D or remotely.

Under one form of the invention, no clock recovery occurs on the die 200. To explain this, the absent element, clock recovery, will be explained.

In general, the data signals received on lines such as W1-A, W1-B, and W1-C are asynchronous, that is, not synchronous. One definition of "asynchronous" is that the data signals are not accompanied by a clock signal which is simultaneously carried on another line and delivered with the data signal to a common destination. However, many types of electronic circuits require a clock, so that a clock must be obtained. Such a clock is recovered from the asynchronous signals, that is, synthesized, based on monitoring the asynchronous signals.

Figure 18:
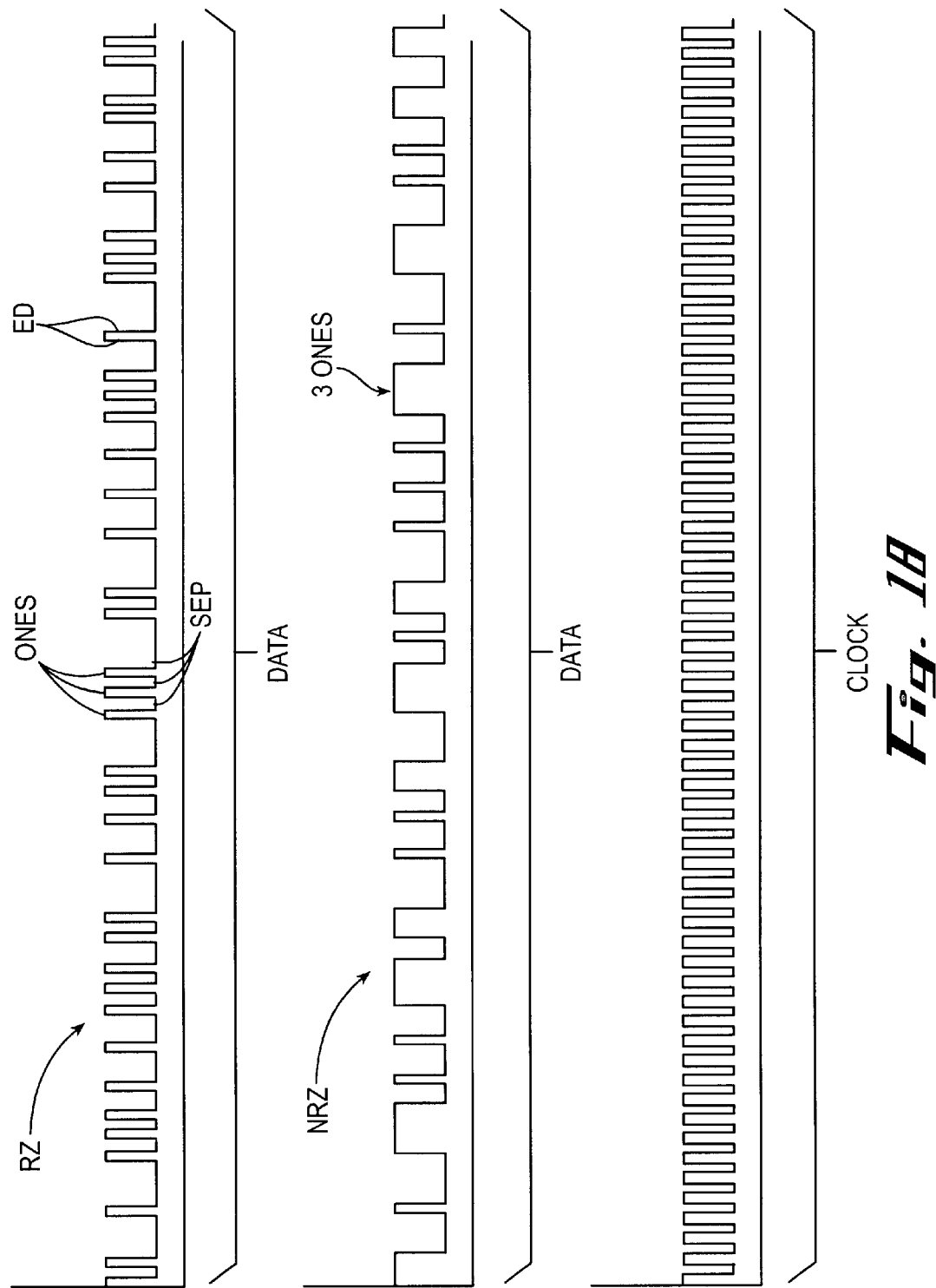
FIG. 18 illustrates two types of signal from which a clock signal may be recovered.

For example, FIG. 18 shows a clock signal. That signal is assumed to exist at the source of an asynchronous data signal, but is not transmitted, and thus does not accompany the asynchronous data signal. One type of asynchronous data signal is shown at the top of the Figure, and is labeled "RZ," which is an acronym for the "Return to Zero" type of signal. In an RZ signal, every individual signal, such as a logic ONE or a logic ZERO is followed by a ZERO-type signal, which is not treated as a logic ZERO, but as a separator between logic signals. That ZERO is the "zero" to which the signal "returns."

Several logic ONEs and ZEROs are labeled in the RZ signal, and the separators are labeled as SEP.

Another type of asynchronous data signal is shown in the center of FIG. 18, and is labeled "NRZ," which is an acronym for "Non-Return to Zero." In an NRZ signal, the separators following logic ONEs are absent. Thus, for instance, the three consecutive ONEs indicated appear as a continuous "DC" signal which persists for three clock periods.

For either signal, RZ or NRZ, when clock recovery is used, circuitry (not shown) on the die 200 in FIG. 17 will monitor the RZ or NRZ signal, and generate an ongoing clock signal having the same phase and frequency as the clock signal indicated at the bottom of FIG. 18.

For example, if the transceiver T located at (64, 1) in FIG. 17 receives the NRZ signal of FIG. 18 on line W1-A in FIG. 17, circuitry (not shown) would generate a clock signal, and that clock signal would be delivered to the transceiver T located at (1, 64) for its own internal use. That use is internal: when that transceiver transmits the signal on line W2-A, the generated, recovered clock signal does not accompany the transmitted signal; it is asynchronous, like that on line W1-A.

Under the invention, no clock recovery is undertaken in the die 200 in FIG. 17. Restated, the signal received on all lines W1 in FIG. 17 is routed along routes R to exit lines W2, without clock recovery.

The invention preferably re-amplifies the received signal, so that, after conversion into the electronic domain from the optical domain, the ONEs and ZEROs possess the proper voltage levels. Also, the invention preferably re-shapes the signals, so that the slopes of the edges of the ONEs become sharpened.

The sharpening will be explained. The edges ED are indicated in FIG. 18, top plot. Each logic ONE pulse is ideally a square wave. However, in reality, that square wave consists of a Fourier series of sinusoids. Each sinusoid is a different frequency. Different frequencies travel at different speeds through the waveguides W1 and W2 in FIG. 12. These speed differences cause the square wave to spread out as it travels, into a trapezoid-like wave, because the fastest sinusoid pulls ahead of the slowest one, and the medium-speed sinusoids remain between the fastest and slowest.

The re-shaping converts the received trapezoid into its original shape of a square wave.

However, no clock is recovered from the asynchronous data signals of FIG. 18. The signals may be re-shaped and re-amplified, but, again, no clock is recovered.

The elimination of clock recovery saves a significant amount of space on the die 200 in FIG. 17, since the clock recovery circuitry consumes a large amount of area. As an approximate example, if the components shown in FIG. 17 occupy an area of A, then clock recovery circuitry would require an area between about 5A and 10A.

In addition, the clock recovery circuitry consumes power roughly in proportion to its area. Thus, the clock circuitry consumes 5 to 10 times the power of the components shown in FIG. 17.

Figure 19:
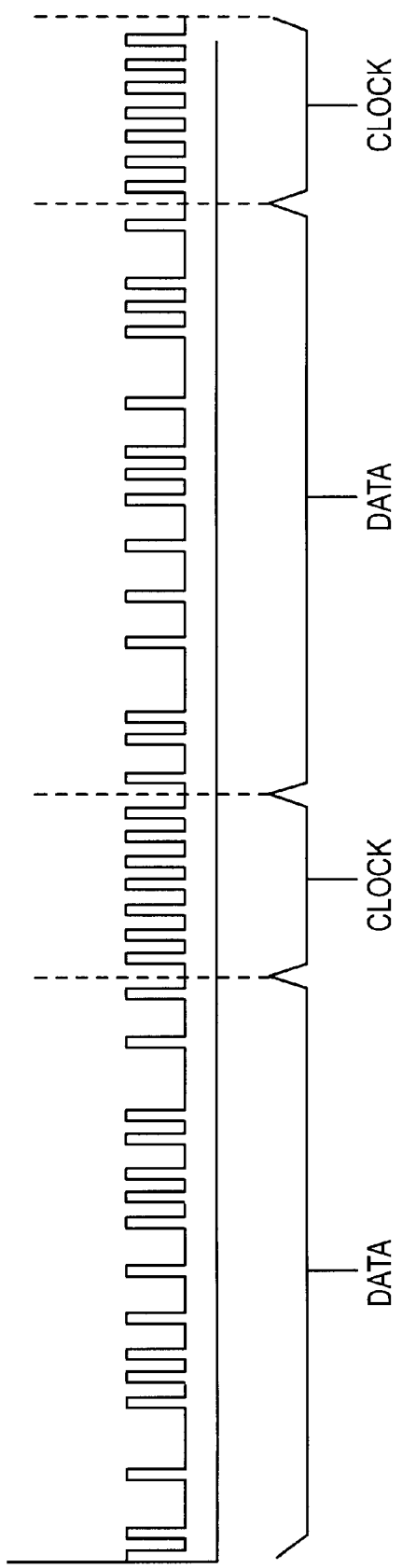
FIG. 19 illustrates time-division multiplexing of periodic bursts of clock signals with data signals.

FIG. 19 shows another form of the invention, and represents an incoming signal, received on an input waveguide W1 of FIG. 17. Interspersed among the data signal is a clock signal. That is, a burst of clock pulses, such as 100 pulses long, periodically replaces the data signal. In one form of the invention, the signal of FIG. 19 is received by the apparatus of FIG. 17, and transmitted without modification.

In another form of the invention, the clock signal within FIG. 19 can be used by the components of FIG. 17, if needed, for their own internal functioning. In addition, the signal of FIG. 19 can be re-amplified, and re-shaped, prior to re-transmission by the apparatus of FIG. 17. The received clock signal, in FIG. 19, may be used in these two processes.

In yet another form of the invention, one, or more, of the input waveguides W1 in FIG. 17 are devoted to clock signals. That is, some of the waveguides carry data exclusively, and one, or some, other waveguides carry clocks exclusively. Both of the types of waveguide, clock and data, are routed, as indicated in FIG. 17.

As a specific example, X number of waveguides may carry related data. A clock signal C1 may accompany them. Those X waveguides would be routed to a common destination by the apparatus of FIG. 17, and the clock signal C1 would accompany them, on its own waveguide.

Similarly, a group of Y waveguides may carry related data. A clock signal C2 would accompany them. Those Y waveguides would be routed to a common destination, different from that for the X waveguides, by the apparatus of FIG. 17, and the clock signal C2 would accompany them, on its own waveguide.

Explained from another perspective, the clock may be time-multiplexed, as shown in FIG. 19. Alternately, the clock may be spatially multiplexed, as explained in the two preceding paragraphs.

Figure 20:
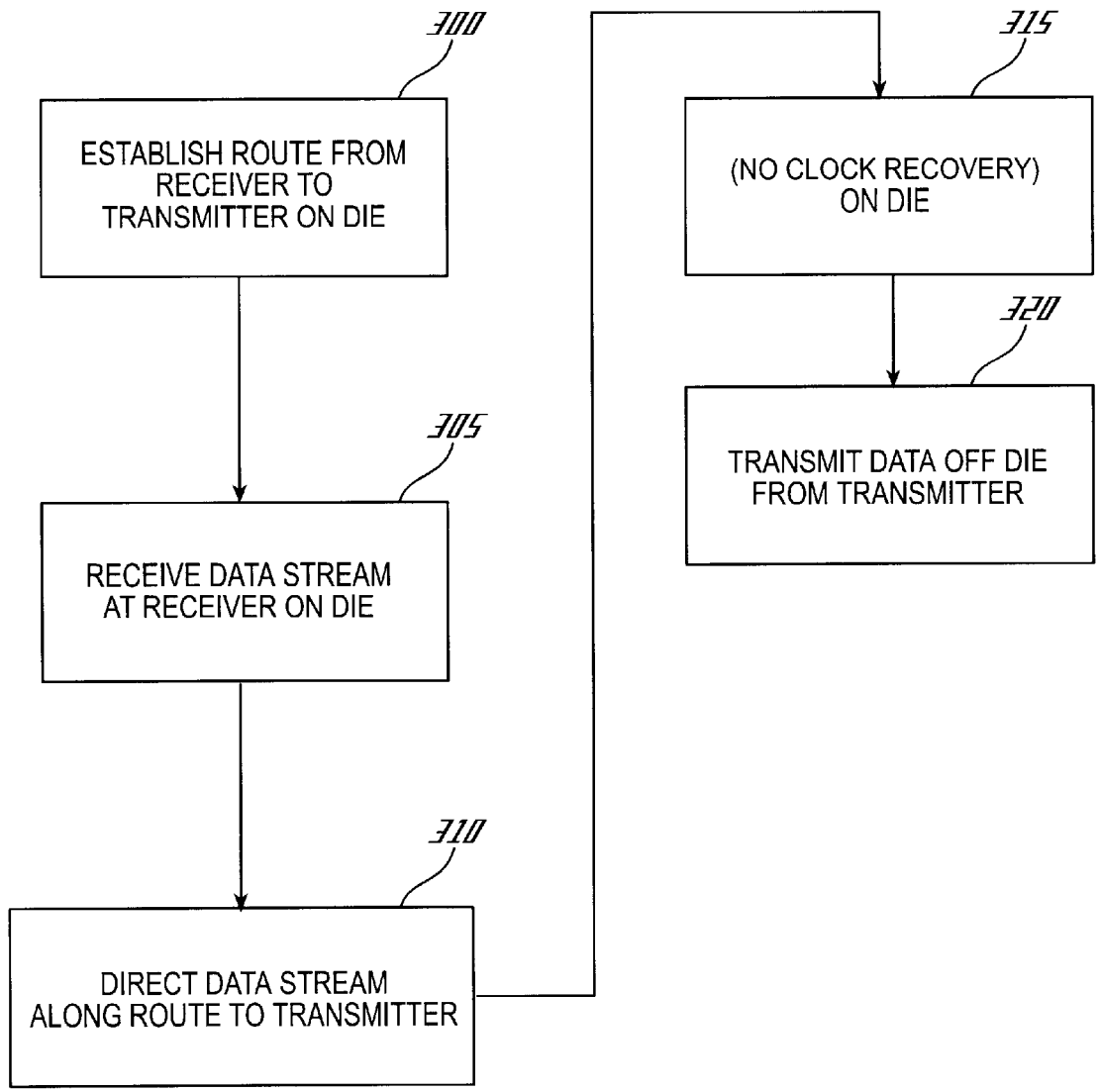
FIG. 20 is a flow chart illustrating logic implemented by one form of the invention.

FIG. 20 is a flow chart of steps undertaken by this form of the invention. This flow chart refers to a single route R, and these steps are repeated for each route.

In block 300, the route R is established. In block 305, a transceiver receives a data stream on a line W1. In block 310, that transceiver transmits the data stream on the route R. Block 315 indicates that no clock recovery is performed. In block 320, the receiving transceiver T on the route R receives the data, and transmits it off the die 200 in FIG. 17, on a line W2.

In one form of the invention, the signal received in block 300 is the type shown in FIG. 19. It contains periodic clock sequences. However, that signal, including the clock sequences, is passed to the transmitter of block 320 in FIG. 20. That transmitter transmits the signal, including the clock sequences, to a line W2. No clock recovery is performed on the die 200 in FIG. 17. Any clock recovery is performed by the agent receiving the signal on line W2, such as one of the NICs in FIG. 13.

In another form of the invention, no data clean-up is performed on the die 200 in FIG. 17. Since the incoming signals are optical, and since the power supply is considered clean, no carriers of electromagnetic noise contact the die 200. Thus, no, or little, noise injection occurs. Consequently, no measures are required to remove the noise, because none was injected in the first place.

If desired, the die 200 can be shielded by a conductive casing, as known in the art, to reduce pick-up of rf noise.

ADDITIONAL CONSIDERATIONS

1. A significant feature of the array of transceivers shown in FIGS. 12–15 is that they are fabricated on a single semiconductor die, in the same clean-room fabrication process. That semiconductor die is a single-crystal structure, or nearly so.

This arrangement is in contrast to another possible arrangement, in which the units are fabricated individually, and then mounted to another type of substrate, such as a printed circuit board. This other arrangement is not favored, for reasons of size and cost. As an example of size, if an individual unit measures ¼×¼ inch, and an array of 64×64 units is to be fabricated, then, as a minimum, the array will measure about 16×16 inches.

2. The elimination of clock recovery does not necessarily require the single-die approach discussed above, nor does it require a matrix of 64×64 transceivers. But it does require a switch, which performs the routing of FIG. 17. Any matrix N×M of transceivers T can be used, wherein N and M are integers which are (1) equal to, or greater than 2 and (2) not necessarily equal. Additionally, a matrix of dimension 1×M can be used, wherein M equals or exceeds 2.

3. In this connection, the symbology of FIG. 17 can be used to represent another embodiment. Block T11, which was taken as a transceiver of the type shown in FIG. 1, is now a pure optical detector. It generates an electronic signal in response to an incoming optical signal on waveguide W1-C.

That electronic signal is routed to block T13, using routing circuitry RO. Block T13 contains a laser driver and a Vertical Cavity Surface-Emitting Laser (VCSEL), which converts the electronic signal to light, for transmission on output waveguide W2-C. No clock recovery occurs.

Numerous substitutions and modifications can be undertaken without departing from the true spirit and scope of the invention. What is desired to be secured by Letters Patent is the invention as defined in the following claims.

What is claimed is:

1. Apparatus for routing data through a switch, comprising:
    a) means for receiving data streams on at least 256 input optical waveguides connected to a single semiconductor die;
    b) means for selectively routing the data streams through channels on the die to respective output optical waveguides; and
    c) means for transmitting data from the die on the output waveguides to remote locations,
   wherein the die utilizes no means for performing clock recovery upon the data streams.

2. Apparatus according to claim 1, wherein the data streams contain clock sequences.

3. Apparatus according to claim 1, wherein the data streams of paragraph (a) are of the Non-Return-to-Zero (NRZ) type.

4. A method of routing data through a switch, comprising the following steps:
    a) receiving data streams on N input optical waveguides connected to a single semiconductor die, wherein N is greater than, or equal to, 1;
    b) selectively routing the data streams through channels on the die to respective output optical waveguides;
    c) within the die, performing no clock recovery on the data streams; and
    d) transmitting data on the output waveguides, to destinations external to the die.

5. Method according to claim 1, wherein the signals received on the input optical waveguides contain (1) data segments which are interleaved with (2) clock sequences.

6. Method according to claim 4, and further comprising the step of performing clock recovery upon data carried on an output waveguide, at a location remote from the die.

7. Method according to claim 4, wherein N exceeds 2.

8. Method according to claim 4, wherein N equals or exceeds 64.

9. Method according to claim 4, wherein the signals received on the input optical waveguides contain (1) data segments which alternate with (2) clock sequences.

10. Method of operating a data switch, comprising the following steps:
    a) receiving optical data on input waveguides;
    b) converting the data into electronic signals, and selectively routing the electronic signals to respective transceivers;
    c) at the transceivers, converting the electronic signals into optical signals, and transmitting them to destinations, using waveguides; and
    d) performing no clock recovery upon the received data.

11. Method according to claim 10, wherein no clock recovery is performed at the switch.

12. Method according to claim 10, wherein clock recovery is performed at the destinations.

* * * * *